Patented Jan. 8, 1946

2,392,435

UNITED STATES PATENT OFFICE 2,392,435

PROCESS OF DISPOSAL OF SULPHITE WASTE LIQUOR

Richard Gaines Tyler, Seattle, Wash.

No Drawing. Application January 25, 1943,
Serial No. 473,518

17 Claims. (Cl. 23—48)

My invention relates to a process of economical disposal of sulphite waste liquor. More particularly, my invention relates to a process for converting waste sulphite liquor into a liquor which may be efficiently evaporated to provide a residue which is burned providing the recovery of commercially valuable chemicals, power and heat.

The use of the sulphite process for the production of pulp from wood has given rise to serious problems. In such process calcium bisulphite is commonly used as the digesting cooking liquor to free the cellulose fibers for making pulp, paper, rayon or other products. Such process involves the production of great quantities of sulphite waste liquor, the disposal of which has constituted a most perplexing problem. When discharged into bodies of water, as is the common practice, objections have been made based on its effects on the streams or bodies of water and water life therein. On this account, strong opposition has arisen. Various solutions for the disposal of such waste sulphite liquor have been tried or proposed. Many attempts have been made to evaporate the liquor for subsequent burning or other use, but such attempts have never come to commercial fruition because of the great difficulties arising during the evaporation steps from the excessive calcium and magnesium scale formation which renders the process unfeasible. Attempts even have been made to use some base other than calcium as the chemical base for the cooking of the pulp and thus circumvent the difficulty due to its presence in the waste liquor. Many endeavors have been made to surmount the difficulties arising from scale formation by modification of the evaporation process through the use of hot gases on falling droplets of liquor, through use of the so called submerged type of torch, and by modification of burning and evaporation systems. All of these efforts have failed for various reasons—not only because of scale formation but because of the production of infusible ash (from which recovery of by-products is extremely difficult because of its extremely low solubility in water) and the high cost of handling or treating the immense quantities of waste sulphite liquor. Accordingly, in spite of all of the highly skilled scientific attention given the subject, the problem of disposal of sulphite liquor heretofore has remained unsolved.

A primary purpose of my invention is the providing of a process which, while permitting employing calcium compounds in the widely employed sulphite process during the digestion, makes possible, by a simple addition without changing the existing process or plant installations, the treatment and evaporation of the sulphite waste liquor, and the production of commercially valuable chemicals, power and heat. Also, my invention or discovery involves the sequence of steps necessary to dispose of sulphite waste liquor by providing a smelt from which valuable chemicals may be derived, and to make this disposal economically feasible not only by the recovery of said valuable chemicals, but also by the production of power and heat.

In my invention or discovery, one step involves the use of an acid resistant base exchanger to substitute sodium for the mineral salts of the calcium and magnesium in the sulphite waste liquor. It will be understood that when the calcium bisulphite process is employed, the metal base of the liquor is primarily calcium, although a small percent of magnesium is also usually present. Likewise it will be understood that when the magnesium process is employed in cooking, the metal base of the liquor is primarily magnesium, although possibly a small percent of calcium will be present. The application of zeolites to industry is limited due to the inherent nature of zeolite agents of becoming impaired by the material or liquid being treated or by constituent elements thereof. That is, zeolite agents are sensitive to their environment. Also, my invention includes the discovery of the sequence of steps for such treatment.

Since the yield of cellulose from wood is less than fifty per cent of the wood treated, slightly over half of the wood constituents remains in the solvent or spent liquor which is called sulphite waste liquor. Consequently, this liquor contains large quantities of various organic and inorganic compounds and is complex in character. Sulphite waste liquor is thus of a very complicated composition, organic and inorganic, with most of its contained solids dispersed and varying from 9% to 15% of the total weight of the liquor. Of these solids, the calcium content in terms of calcium oxide (CaO) varies from 3% to 14% by weight of the total solids. In addition to the chemical complexity, the great volume of the liquor itself adds to the complexity of the problem. So great is the volume of the liquor that the common method of disposal has been to let it run into streams or bodies of water.

Sulphite waste liquor is strongly acid, having a pH of from 1.5 to 3.0. Parenthetically, the term pH is a symbol used to designate the concentration of hydrogen ions present in a substance and is numerically equal to the logarithm of the reciprocal of the hydrogen ion concentration. High acidity is caused by the presence of a high concentration of hydrogen ions. Therefore, the greater the acidity of a substance the smaller will be its pH. A pH of 7.0 represents neutrality, so that a pH of 1.5 to 3.0 for said liquor represents high acidity.

Furthermore, the great quantities of the sulphite waste liquor unavoidably developed by sulphite digestion require, in order to save heat, storage and rehandling, that it be treated for economical disposal purposes while still substantially at the temperature at which it is recovered after discharge from the digester, i. e., which usually is about 180° F.

All of the above characteristics, high quantities of solids, extreme acidity, relatively high temperature and great volume combine to present a difficult and complex problem in disposing of the sulphite waste liquor. Any one of these characteristics, in and of itself, would be sufficient to present serious difficulty, but when combined, the difficulties are greatly augmented. This is especially true when it is attempted to produce a reaction whereby the calcium base of the sulphite liquor is changed into a sodium base.

The complexity of the process was further involved by reason of the fact that it was generally considered that the calcium or some part thereof was not in an ionized form or was so bound to the organic matter present as to render it inaccessible to the base exchange action of zeolites. The effect of the high calcium concentration on the reaction was also unknown and unpredictable. However, by extended experimentation I have discovered that certain types of base exchangers, namely, acid resistant base exchangers are operable under the conditions of treatment set forth herein for sulphite waste liquor. Of such base exchangers, carbonaceous exchangers constitute a preferred example for use in my invention or discovery. Typical examples of acid resistant base exchangers which may be obtained on the market are "Zeo-Karb," "Catex," "Resinox" and the "Amberlites." "Zeo-Carb" and "Catex" are carbonaceous, non-siliceous products made by the action of concentrated sulphuric acid or oleum on coal, lignite, or wood. "Resinox" and the "Amberlites" are phenolformalde thermo-setting resins.

Further I have discovered that after extended use the said base exchangers did not show any of the following critical and often characteristic and well known weaknesses, that is, did not become fragile, did not disintegrate through swelling, or show any tendency towards peptization, or passing into solution. All these factors assume their truly important positions when it is remembered that any practical process for disposing of sulphite waste liquor must be capable of dealing with the vast quantities of waste liquor produced by the sulphite digestion process. This great volume necessitates utmost efficiency in treating and in the economy of the operation of the process. Particularly is this true since the process relates to disposing of a trade waste for which, up to the present time, no profitable extended use has been found despite protracted investigation.

Carbonaceous base exchangers, known for some years, are synthetically prepared and consist mainly of carbon. These exchangers are manufactured from carbonaceous material such as coal by treating the same with sulphuric acid or sulphur trioxide. Carbonaceous base exchangers, operating as cation exchangers when regenerated with sodium chloride, have the ability in treating water supplies to remove calcium, magnesium, and other positive ions.

As illustrative of some of the experimental work relative to the use of acid resistant base exchangers, the following summarizing data of tests on two sulphite liquors designated A and B are set forth:

A comprised:

| | |
|---|---|
| Total solids | 10.0% |
| pH | 3.58 |
| Percent of calcium (bone dry basis) | 4.72 |
| Temperature | 180±5° F. |

B comprised:

| | |
|---|---|
| Total solids | 10.0% |
| pH | 1.37 |
| Percent calcium (bone dry basis) | 3.02 |
| Temperature | 180±5° F. |

In demonstrating my invention, I employed in this set of experiments a stainless steel tube 13½" long and 1 1/16" inside diameter with rubber stoppers in each end. A layer of glass wool ½" thick functioning as a screen was employed in the bottom of the tube and 76 grams of dry carbonaceous base exchanger was dispersed above the glass wool. A pad of glass wool was also used on top of the base exchanger, and thus kept the exchanger from being washed out of the tube and served as a screen to retain the material in position whether the flow was either up or down the unit during operation or regeneration and washing. Glass tubes passing through the stoppers served as means by which liquids were introduced to the stainless steel tube and effluents withdrawn therefrom.

Using liquor A, I pursued the following course of treatment:

In order to insure that the carbonaceous base exchanger was in condition for operation, first I passed a brine solution (15% sodium chloride solution) through the apparatus by introducing it into the bottom of the tube and discharging the effluent from the top to the sewer. I used such strength of brine solution (which is excessive in strength for commercial economic use) to increase speed in the experiment. However, in commercial use the strength of the solution will be determined by economic considerations which in large measure will depend upon local operating conditions. Following the brine solution, soft water was introduced to wash the exchanger until the effluent was practically free from chlorides. Water from any fresh water supply, even though the water is hard, would be satisfactory. The above may be considered as preliminary treatment of the base exchanger. With the condition of the base exchanger as thus definitely established, cycle one may be considered as starting with the introduction of liquor A to the base exchanger.

Liquor A, at a temperature corresponding to that of waste liquor recovered after discharge from the digester (e. g., about 180° F.), in the amount of 350 cc. was passed through the tube at the rate of 10 cc. per minute. This amount of liquor, 350 cc., was determined experimentally as the amount from which calcium could be removed 100% in this experiment. If amounts of liquor greater than 350 cc. were passed through the apparatus, the calcium was not removed 100%. The rate of flow of 10 cc. per minute was found to be satisfactory herein, but obviously the period of contact will depend not only upon the rate of flow but also upon the volume and character of the base exchanger and the concentration of the calcium and magnesium content of the sulphite liquor. Therefore the most economical period of contact must be determined experimentally for each installation as local conditions will govern. The stainless steel tube containing the carbonaceous base exchanger was kept in a water bath at about 180° F. during the part of the cycle when waste liquor was passed through the tube in order to maintain the liquor A in heated condition, i. e., at about the temperature which would exist under commercial operating conditions. In commercial installations the container for the carbonaceous base exchanger will be heat insulated to conserve as much as possible of the sensible heat present in the sulphite waste liquor which it received from the digesters.

The flow of the liquor A was stopped and wash water was introduced and it was found that 100 cc. of wash water was used for substantially complete washing of the carbonaceous base exchanger free of all sulphite waste liquor. While this amount of wash water was used in my experiments to insure substantially complete washing, the exact amount used in any commercial installation will depend upon local operating conditions. With this washing one cycle was completed so far as the base exchanger was concerned.

The regeneration of the carbonaceous base exchanger was then carried on by passing 1400 cc. of 15% sodium chloride solution through the tube at the rate of 20 cc. per minute. After 1400 cc. of brine solution had passed through the tube, it was found that the effluent brine was calcium-free when tested with ammonium chloride and ammonium oxalate. As respects the percentage or quantity of salt used, the same observation hereinabove set forth regarding the same is applicable here. Following this regeneration with brine solution, 1200 cc. of said soft or wash water was passed through, this amount being necessary to reach the point where the wash water effluent did not give a showing of chlorides, when tested therefor. As respects this amount of wash water, the same observation as hereinabove set forth regarding the same is applicable here. With this washing of the regenerated base exchanger, one cycle was completed so far as the exchanger was concerned. Then another batch (350 cc.) of liquor A was treated in a second cycle and further cycles continued in accordance with the above procedure.

The calcium removal of various batches of liquor A remained constant through eighty-five cycles and there were no indications that the capacity of the carbonaceous base exchanger for calcium removal was changed. During each cycle there was a gradual change in the pH of the treated sulphite waste liquor as it emerged from the apparatus. The pH of the effluent in the case of liquor A started out on each cycle at 4.7 and gradually fell to 3.5. This indicates that some hydrogen exchange also took place.

Experimental work with the highly acid liquor B, which contained a lower calcium content, was the same as the procedure carried on with liquor A except that 375 cc. of liquor B was treated on each cycle and 1200 cc. of 15% brine solution was used for regeneration instead of 1400 cc. After the flow of liquor B was stopped 100 cc. of wash water was employed and following the regeneration with brine solution, 1200 cc. of said wash water was used. As respects the percentage or quantity of brine solution, and the amounts of wash water, the exact amount used in any commercial installation will depend upon local operating conditions. In the case of liquor B the pH of the effluent on each cycle started out at 4.5 and gradually fell to 2.0.

After completing eighty-five cycles on liquor A and eighty-five cycles on liquor B, the base exchange material was closely examined but no physical deterioration, even under the microscope, could be observed. Also, no loss in weight or any decrease in calcium removal capacity could be detected. Such extended use of the base exchange material, without any apparent change, establishes definitely the long life of the material when employed under conditions obtaining in my invention and the commercial practicability of its use in my process of treating sulphite waste liquor.

After treating the sulphite waste liquor as above described, the effluent from my process is a liquor whose properties particularly lend themselves to efficient evaporation to a high percentage of solids, approximately 45 to 65%, without developing scaling troubles which would promptly originate from the evaporation of the original untreated liquor. The sensible heat present in the effluent (originating in the digester) was conserved therein so that a minimum of heating was required for its evaporation. When the effluent of my process was concentrated by evaporation, I discovered that the concentrated liquor could be burned in conventional type furnaces, commonly employed for this type of material, with the production of a smelt containing sodium salts. From this smelt valuable by-products may be readily recovered.

Liquors containing sodium and high proportions of organic materials upon combustion in a furnace give different results when a furnace is operated under oxidizing conditions than when operated under reducing conditions. Under oxidizing conditions the ash includes sodium carbonate and sodium sulphate. Under reducing conditions the ash coming from the furnace includes sodium carbonate and sodium sulphide. Sodium sulphate, sodium sulphide, and sodium carbonate are used in large quantities in industry and are therefore of important commercial value. The value of the process embodying my invention therefore depends to a certain extent not only in providing a transformation of the sulphite waste liquor into a liquor which can be evaporated without scaling difficulties, but also depends in part upon the production of valuable commercial by-products upon the burning of the liquor, i. e., on the production of sodium carbonate and sodium sulphate and sodium sulphide.

The effluent liquor after passing through the base exchanger is termed herein base exchanger treated liquor. This liquor, concentrated by evaporation, is burned in a furnace as ordinarily used in kraft mills for the combustion of kraft liquor equipped with a boiler for the recovery of heat by steam production. This steam in turn is used for the operation of the multiple effect evaporators as needed. Preferably, the boilers should operate at pressures much higher than that of the steam needed for the evaporation step of my invention so that valuable electrical power can be produced in reducing the steam pressure through the medium of turbines. The turbines may be employed to develop electric power and this power thus produced will add considerably to the economy of the process. The steam produced from the liquor burning step of my process should be more than enough to operate the evaporator plant provided (1) that the liquor as received from the raw pulp contains at least 10% total solids and (2) that the evaporation plant be efficiently designed so that at least three pounds of water will be evaporated per pound of steam used. If these conditions are fulfilled the steam produced from the combustion of the liquor should be more than sufficient to operate the evaporator plant and then permit production of excess steam for the production of electric power and thereby add to the economy of the process.

My invention thus accomplishes several important objectives. First, in the act of removing calcium and of burning waste sulphite liquor, the waste sulphite liquor disposal problem is solved and this for the first time by an economical and practically operative process. Second, the ash derived from the combustion of the sulphite liquor transformed during the first stages of my invention in which calcium has been replaced by sodium, yields certain commercially valuable chemicals as sodium salts. These are valuable articles of commerce and their value helps pay the cost of operating the other steps of the process. Third, moreover there is the development of the electric power as above set forth as well as the necessary steam to produce heat for the evaporation step of my process. Fourth, a further possible, but optional, by-product recovery would be that of sulphur dioxide gas from the flue gases derived from the combustion of the sulphite waste liquor by means of absorption in water in absorption towers.

My invention or the process of my discovery has been deliberately operated under the most adverse conditions which might be encountered in commercial use in respect to acidity, quantities of organic solids, and temperature, which might break down base exchange material. The process has been proven to be chemically sound and commercially workable. All of the equipment, commercial and experimental, referred to herein is of well known conventional commercial design and standard construction as long used in industry.

I have found that sea water can be employed advantageously during the regeneration of the acid resistant base exchanger. This is a further advantage so far as providing economy is concerned. When the sulphite pulp mill is located on tide water, where sea water is available, then sea water can be used in a series process for the major portion of the regenerative process.

To accomplish complete calcium removal or calcium removal up to 99%, which to all intents and purposes is complete from a practical standpoint, it is commercially profitable to supplement the sea water regeneration with brine solution containing 5% to 15% sodium chloride. This would be a series process and in this case the base exchangers are first regenerated with filtered sea water until the calcium is removed therefrom so far as economically practical. At this point the sea water is cut off and the regeneration continued with a brine solution prepared from sodium chloride.

In condensed or abbreviated form my invention comprises the following steps:

1. Removing the calcium and magnesium from sulphite waste liquor as recovered from the raw pump while still at elevated temperature by employing an acid resistant base exchanger.
2. Washing the said base exchanger with water to remove entrained sulphite waste liquor.
3. Regenerating the said base exchanger with solution containing sodium chloride—using said solution or a series process comprising treating with sea water followed by treating with said solution.
4. Washing said base exchanger with water to remove the solution containing sodium chloride.
5. Evaporating the effluent sulphite waste liquor coming from the base exchange step of the process, preferably in multiple effect evaporators, to a solids content such that it can be burned, for example, 45–65%.
6. Burning the liquor concentrated by evaporation in a furnace as ordinarily used in kraft mills for the combustion of kraft liquor equipped with a boiler for the recovery of heat by steam production some of which, in turn, is used for the operation of the multiple effect evaporators as needed. Preferably the boilers should operate at pressures much higher than the steam needed for the evaporation step so that valuable electric power can be produced in reducing the steam pressure through turbines. The electric power thus produced will add considerably to the economy of the process.
7. Recovery from the smelt of sodium salts from the furnace, such as, sodium carbonate and sodium sulphate (if the furnace is operated under oxidizing conditions) or sodium carbonate and sodium sulphide (if the furnace is operated under reducing conditions).
8. (Optional)—Recovering sulphur dioxide gas from the flue gases derived from the combustion of sulphite waste liquor by means of absorption in water in absorption towers.

I claim:

1. In the process of disposing of sulphite waste liquor derived from manufacturing pulp by an alkaline earth bi-sulphite digestion of wood, the improvement which comprises passing sulphite waste liquor in the concentration as received from the digester through an acid resistant base exchanger which has been previously regenerated by means of a solution containing sodium chloride whereby the alkaline earth metal content of the sulphite waste liquor is substantially replaced by sodium of said acid resistant base exchanger.

2. In the process of disposing of sulphite waste liquor derived from manufacturing pulp by a calcium bisulphite digestion of wood, the sequence of steps comprising passing sulphite waste liquor in the concentration as received from the digester through a carbonaceous base exchanger which has been previously regenerated by means of a solution containing sodium chloride whereby the calcium content of the sulphite waste liquor is substantially replaced by sodium of the carbonaceous base exchanger, and reducing the water content of the effluent liquor.

3. In the process of disposing of sulphite waste liquor derived from manufacturing pulp by a calcium bisulphite digestion of wood, the sequence of steps which comprises passing sulphite waste liquor through a carbonaceous base exchanger which has been previously regenerated by means of a solution containing sodium chloride whereby the effluent liquor is substantially freed of calcium compounds, reducing the water content of the effluent liquor, and burning the residue to a smelt containing commercially valuable sodium salts.

4. In the process of disposing of sulphite waste liquor derived from manufacturing pulp by a calcium bisulphite digestion of wood, the improvement which comprises passing sulphite waste liquor in the concentration as received from the digester in a hot condition through a carbonaceous base exchanger which has been previously regenerated by means of a solution containing sodium chloride whereby the alkaline earth metal content of said sulphite waste liquor is substantially replaced by sodium of said carbonaceous base exchanger and the sensible heat content of the sulphite waste liquor is conserved in the effluent liquor.

5. In the process of disposing of sulphite waste liquor derived from manufacturing pulp by a calcium bisulphite digestion of wood, the improvement which comprises passing sulphite waste liquor in the concentration as received from the digester in a hot condition through a thermally insulated mass of carbonaceous base exchanger which has been previously regenerated by means of a solution containing sodium chloride whereby the calcium content of said sulphite waste liquor is substantially replaced by sodium of the said carbonaceous base exchanger and the sensible heat content of said hot sulphite waste liquor is conserved.

6. In the process of disposing of sulphite waste liquor derived from manufacturing pulp by an alkaline earth bisulphite digestion of wood, the sequence of steps which comprises passing sulphite waste liquor in a hot condition through a thermally insulated mass of acid resistant base exchanger which has been previously regenerated by means of a solution containing sodium chloride, whereby the alkaline earth metal content of said sulphite waste liquor is substantially replaced by sodium of said acid resistant base exchanger, evaporating the effluent liquor with its conserved heat content by the application of additional heat to a residue containing approximately 45% to 65% solids, and burning said residue to a smelt containing commercially valuable sodium salts.

7. The process of disposing of sulphite waste liquor derived from manufacturing pulp by a calcium bisulphite digestion of wood, which comprises passing sulphite waste liquor at a temperature of about 180° F. through a carbonaceous base exchanger which has been previously regenerated by means of a solution containing sodium chloride whereby the calcium content of said sulphite waste liquor is substantially replaced by the sodium of said carbonaceous base exchanger, producing an effluent liquor retaining heat of said sulphite waste liquor, reducing the water content of the effluent liquor with its heat content by supplying additional heat to provide a residue containing approximately 45% to 65% solids, and burning said residue to a smelt containing commercially valuable sodium salts.

8. The process of disposing of sulphite waste liquor derived from manufacturing pulp by a calcium digestion of wood, comprising passing sulphite waste liquor at a temperature of about 180° F. through a carbonaceous base exchanger which has been previously regenerated by means of a solution containing sodium chloride whereby the calcium content of said sulphite waste liquor is substantially replaced by the sodium of said carbonaceous base exchanger, producing an effluent liquor retaining heat of said sulphite waste liquor, reducing the water content of the effluent liquor with its heat content by supplying additional heat to provide a residue containing approximately 45% to 65% solids, burning said residue to a smelt containing commercially valuable sodium salts, and regenerating said carbonaceous base exchanger by means of a solution containing sodium chloride.

9. In the process of disposing of sulphite waste liquor derived from manufacturing pulp by a calcium bisulphite digestion of wood, the cyclic sequence of steps which comprises passing sulphite waste liquor in the concentration as received from the digester through a carbonaceous base exchanger whereby the calcium content of said sulphite waste liquor is substantially replaced by sodium of said carbonaceous base exchanger, and regenerating the carbonaceous base exchanger by means of a solution containing sodium chloride.

10. In the process of disposing of sulphite waste liquor derived from manufacturing pulp by a calcium bisulphite digestion of wood, the cyclic sequence of steps which comprises passing sulphite waste liquor in the concentration as received from the digester through a carbonaceous base exchanger whereby the calcium content of said sulphite waste liquor is substantially replaced by the sodium of said carbonaceous base exchanger, partially regenerating the carbonaceous base exchanger by means of sea water, and completing the regeneration of the carbonaceous base exchanger by means of a solution containing sodium chloride.

11. In the process of disposing of sulphite waste liquor derived from manufacturing pulp by a calcium bisulphite digestion of wood, the sequence of steps which comprises passing sulphite waste liquor through a carbonaceous base exchanger which has been previously regenerated by means of a solution containing sodium chloride, whereby the calcium content of said sulphite waste liquor is substantially replaced by the sodium of said carbonaceous base exchanger, reducing the water content of the effluent liquor, burning the residue to a smelt and recovering sodium salts from the smelt.

12. In the process of disposing of sulphite waste liquor derived from manufacturing pulp by an alkaline earth bisulphite digestion of wood, the sequence of steps which comprises passing sulphite waste liquor at an elevated temperature through an acid resistant base exchanger which has been previously regenerated by means of a solution containing sodium chloride, whereby the alkaline earth metal content of the sulphite waste liquor is substantially replaced by sodium, washing the said base exchanger with water to remove entrained sulphite waste liquor, regenerating said base exchanger with a solution containing sodium chloride, washing said base exchanger with water to remove entrained sodium chloride, evaporating the effluent sulphite waste liquor coming from the base exchanger in a multiple effect evaporator to a solids content of 45% to 65%, burning the residue of said evaporated effluent liquor to a smelt, conserving the heat from the combustion of said residue, and recovering sodium salts from the smelt.

13. In the process of disposing of sulphite waste liquor derived from manufacturing pulp by an alkaline earth bisulphite digestion of wood, the sequence of steps which comprises passing sulphite waste liquor at a temperature of about 180° F. through an acid resistant base exchanger which has been previously regenerated by means of a solution containing sodium chloride whereby the alkaline earth metal content of said sulphite waste liquor is substantially replaced by the sodium of said carbonaceous base exchanger, producing an effluent liquor retaining heat of said sulphite waste liquor, reducing the water content, evaporating the effluent liquor with its heat content by supplying additional heat to a residue containing approximately 45% to 65% solids, burning said residue to a smelt containing commercially valuable sodium salts, and recovering sulphur dioxide gas from the flue gases derived from the combustion of said residue.

14. In the process of disposing of sulphite waste liquor derived from manufacturing pulp by a calcium bisulphite digestion of wood, the sequence of steps which comprises passing sulphite waste liquor through a carbonaceous base exchanger which has been previously regenerated by means of a solution containing sodium chloride, whereby the calcium content of said sulphite waste liquor is substantially replaced by sodium of said carbonaceous base exchanger, reducing the water content of the effluent liquor, burning the resulting residue to a smelt under reducing conditions and recovering sodium sulphide and sodium carbonate from the smelt.

15. In the process of disposing of sulphite waste liquor derived from manufacturing pulp by a calcium bisulphite digestion of wood, the sequence of steps which comprises passing sulphite waste liquor through a carbonaceous base exchanger which has been previously regenerated by means of a solution containing sodium chloride, whereby the calcium content of said waste sulphite liquor is substantially replaced by sodium of said carbonaceous base exchanger, reducing the water content of the effluent liquor, burning the resulting residue to a smelt under oxidizing conditions, and recovering sodium sulphate and sodium carbonate from the smelt.

16. In the process of disposing sulphite waste liquor derived from manufacturing pulp by a calcium bisulphite digestion of wood, the cyclic sequence of steps which comprises passing sulphate waste liquor in the concentration as received from the digester through a carbonaceous base exchanger whereby the calcium content of said sulphite waste liquor is substantially replaced by the sodium of said carbonaceous base exchanger, partially regenerating the carbonaceous base exchanger by means of sea water, completing the regeneration of the carbonaceous base exchanger by means of a solution containing sodium chloride, reducing the water content of the effluent liquor coming from the base exchanger, burning the residue to a smelt and recovering sodium salts from the smelt.

17. In the process of disposing of sulphite waste liquor derived from manufacturing pulp by a calcium bisulphite digestion of wood, the sequence of steps which comprises passing sulphite waste liquor in the concentration as received from the digester through an acid resistant base exchanger which has been previously regenerated by means of a solution containing sodium chloride whereby the effluent liquor is substantially free of calcium compounds, reducing the water content of the effluent liquor, and burning the residue to a smelt containing commercially valuable sodium salts.

RICHARD GAINES TYLER.